May 8, 1934.                    E. B. KERR                    1,957,966
                                 COUPLING
                            Filed Nov. 8, 1932
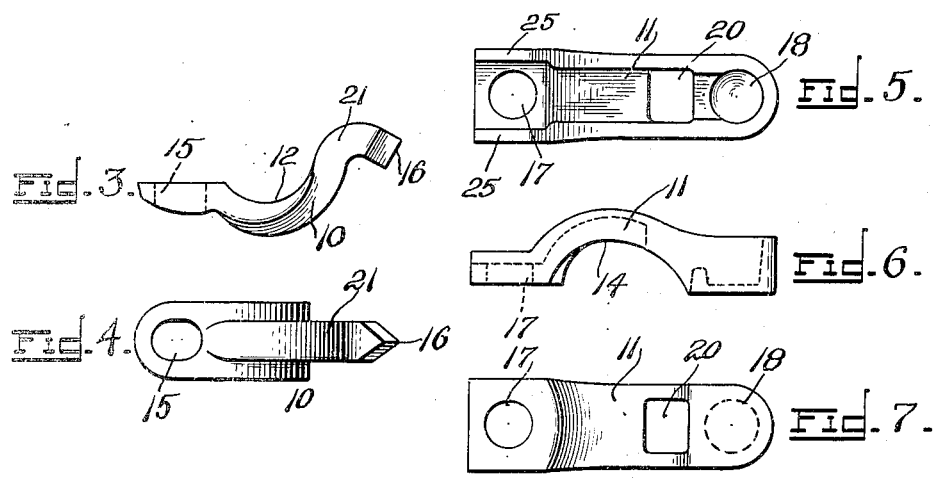
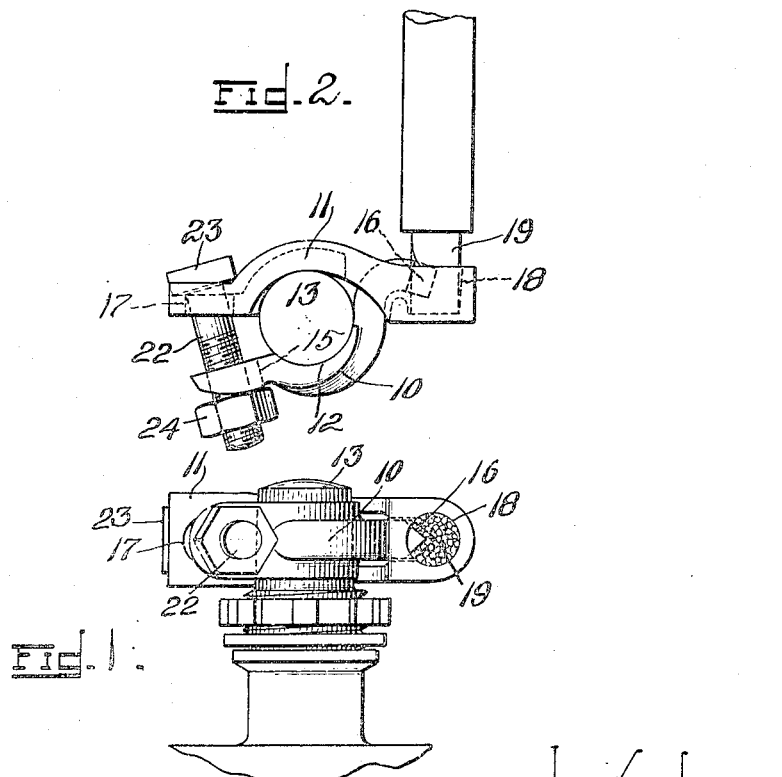
Inventor
Emmons B. Kerr
By Arthur F. Randall
              Atty.

Patented May 8, 1934

1,957,966

UNITED STATES PATENT OFFICE 1,957,966

COUPLING

Emmons B. Kerr, Nashua, N. H.

Application November 8, 1932, Serial No. 641,749

3 Claims. (Cl. 173—259)

My invention relates to connectors or couplings and more especially to devices of this class by means of which two elements are connected both mechanically and electrically.

The object of my invention is to provide a strong and reliable connector or coupling of the class referred to which will be of efficient and inexpensive construction, and the parts of which can be readily renewed when necessary.

To these ends I have provided a coupling or connector of the class described comprising a pair of separable lever members and a pressure-applying device co-operatively associated with proximate ends of said two lever members and operable to forcibly clamp the intermediate portions of said two lever members against one of the two elements that are to be connected thereby to cause the opposite proximate ends of said lever members to forcibly grip the other of said two elements.

Thus it is a distinguishing feature of my invention that the two lever members when acted upon by the pressure-applying device utilize one of said elements as a fulcrum to cause the other of said two elements to be forcibly gripped by said lever members after the manner of pincers.

Other features of my invention are hereinafter pointed out.

In the accompanying drawing:

Figure 1 is a side elevation of a battery terminal having applied thereto a coupling constructed in accordance with my invention.

Figure 2 is a plan view of some of the parts shown in Figure 1.

Figures 3 and 4 illustrate the construction of one of the two lever members hereinafter described.

Figures 5, 6 and 7 illustrate the construction of the other lever member hereinafter described.

The embodiment of my invention herein illustrated comprises two rigid metallic lever members 10 and 11. The lever member 10 is of ogee shape and made upon its inner side with a recess or socket 12 to fit against one side of a battery terminal post 13 as shown in Figs. 1 and 2, while the lever member 11 is made intermediate its ends and upon its inner side with a somewhat similar recess or socket 14 to fit against the opposite side of the battery terminal.

Near one end thereof the lever member 10 is made with an elongate aperture or bolt hole 15 while the opposite end portion of said member is of reduced width to provide a relatively narrow finger end portion 21 which may have a wedge shaped end or extremity 16.

The end portion of the lever member 11 at one side of its recess or socket 14 is also made with an aperture or bolt hole 17 while the opposite end portion thereof is formed with a socket 18 for the reception of the end of a conductor 19, and close to this socket 18 said end portion is made with a rectangular aperture 20.

The relatively narrow finger portion 21 of the lever member 10 is curved reversely with respect to the curvature of the socket 12 so that lever member 10 is of ogee shape longitudinally as viewed in Fig. 2.

Extending through the holes 15 and 17 of the lever members is a bolt 22 which is the pressure applying device of the illustrated embodiment. This bolt is made with a square head 23 bearing against the outer side of lever member 11 and is provided near its opposite end with a nut 24 to bear against the outer side of the lever member 10.

Upon the outer side of the lever member 11 the latter is formed with longitudinal marginal beads or flanges 25, one at each side thereof, adapted to receive between them the square head 23 of bolt 22 thereby to hold said bolt against rotating when the nut 24 is operated.

The parts of my new connector are assembled with the bolt 22 occupying the bolt holes 15 and 17 of the lever members and with the finger portion 21 of lever member 10 extending through the aperture 20 of lever member 11.

When the parts are assembled in this fashion the connector is slid into position upon the battery terminal 13 and after inserting the end of the conductor 19 within the socket 18 of lever member 11, the nut 24 is tightened forcibly. As the nut 24 is tightened and the ends of the lever members engaged by the bolt are forced toward each other, said lever members fulcrum on the battery terminal 13 thereby forcing the opposite end portions of the lever members toward each other so that the wedge-shaped or sharpened end 16 of the finger 21 is driven into the conductor 19 and forcibly clamps the latter within the socket 18.

It will be clear that because of the penetrating action of the wedge shaped end or blade 16 of the lever member 10 a perfect electrical and mechanical connection will be made between the conductor 19 and the coupling. It will also be clear that the two lever members establish equally good contact with the battery terminal 13.

In practice I make the lever members as separate bronze castings dipped in lead to provide them with an exterior coating which protects them from the destructive action of acid.

My new coupling provides a very secure and reliable connector by which two elements are mechanically and electrically conected. The above described construction also has the advantage that the two lever members are not connected otherwise than by bolt 22, which permits of quick application and removal of the device. Also, either of the lever members can readily be replaced by a new one when required since they are separably connected by the bolt 22.

What I claim is:

1. A connector of the character described comprising two separable lever members formed intermediate their ends with sockets to engage with the opposite sides of a battery terminal post, one of said members being formed adjacent to one end thereof with a socket for the end of a cable by which said end is supported with its axis perpendicular to the axis of said post and also formed intermediate said cable socket and said post with an aperture, and the other member being of ogee shape and having one end portion thereof extending through said aperture and into said cable socket so as to have endwise abutting engagement with one side of the cable, and a bolt connecting the opposite ends of said lever members and operable to clamp the latter to the battery terminal post and cable.

2. A connector of the character described constructed in accordance with claim 1 wherein the cable-engaging end of said last-mentioned lever member is made wedge-shaped so as to penetrate the cable thereby to expand said cable within said cable socket.

3. A connector of the character described constructed in accordance with claim 1 wherein one of said lever members is made with a socket that is occupied by the head of said bolt so that the latter is held against rotation on its own axis.

EMMONS B. KERR.